United States Patent

O'Brien

[11] 3,909,558
[45] Sept. 30, 1975

[54] ELECTROMECHANICAL AMPLIFIER SOUND TRANSDUCER WITH COMBINED POWER SOURCE

[76] Inventor: Jerry O'Brien, 33 Pamrapo Ave., Jersey City, N.J. 07305

[22] Filed: Oct. 7, 1974

[21] Appl. No.: 512,190

[52] U.S. Cl. .............................................. 179/141
[51] Int. Cl.² ........................................ H04R 21/02
[58] Field of Search......... 179/121 R, 131, 136, 137, 179/140, 141, 142; 340/8 FT, 13 R, 14

[56] References Cited
UNITED STATES PATENTS

| 298,286 | 5/1884 | Clay.................................. 179/131 |
| 3,136,854 | 6/1964 | Willick............................. 340/13 R |

*Primary Examiner*—Kathleen H. Claffy
*Assistant Examiner*—George G. Stellar
*Attorney, Agent, or Firm*—Richard L. Miller

[57] ABSTRACT

This invention described an electromechanical amplifier sound transducer which can convert acoustical waves into amplified electrical waves. Conductive supports are mounted onto a housing which receives the acoustical waves. Coupling assemblies conductively connect a battery to the supports. As the acoustical waves are received, it causes the housing to vibrate. The vibrations are transmitted through the conductive supports to intermittently interrupt the conductive connection between the battery and the conductive supports to convert the acoustical waves into amplified electrical waves.

10 Claims, 6 Drawing Figures

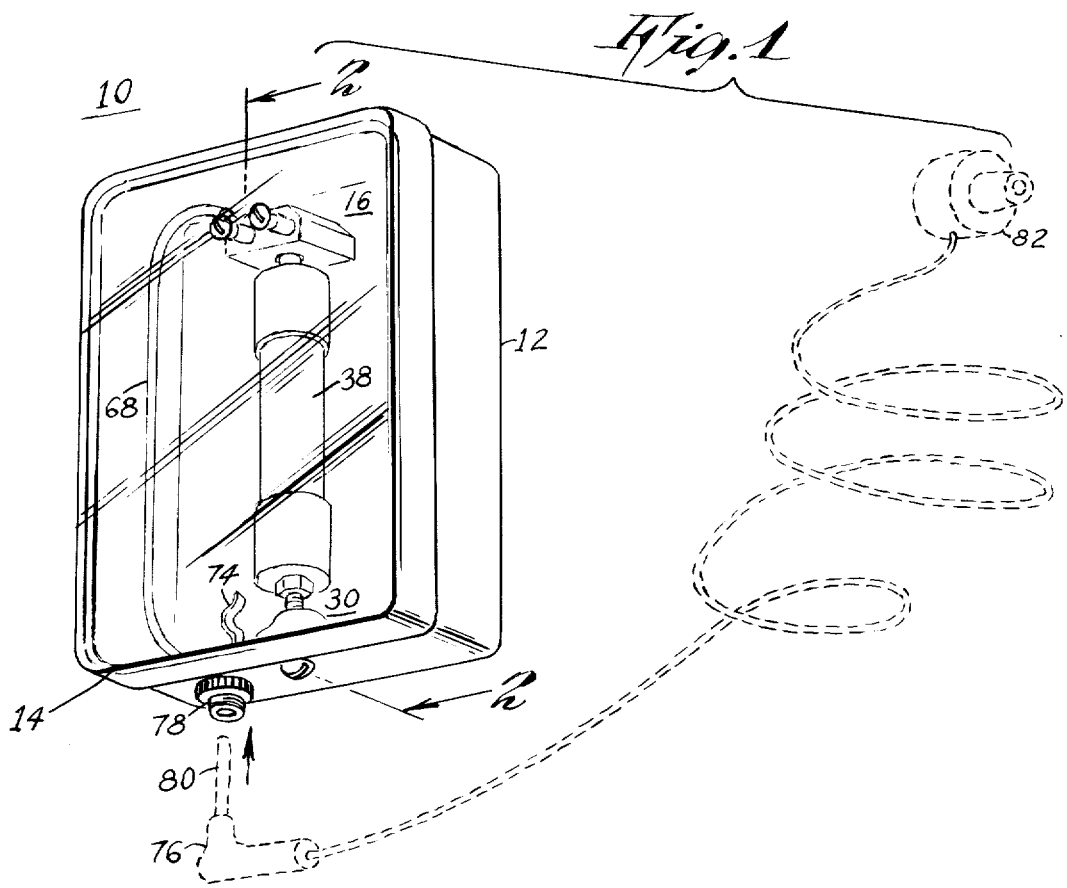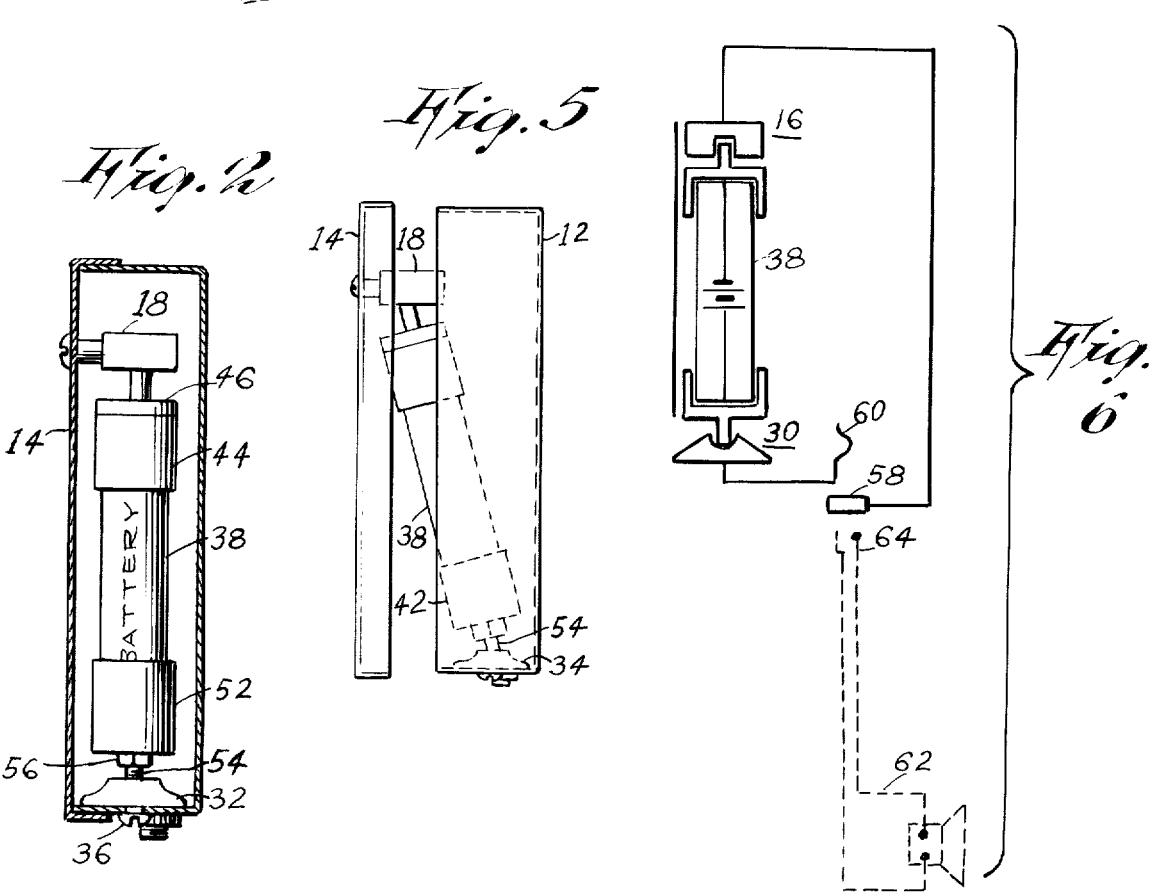

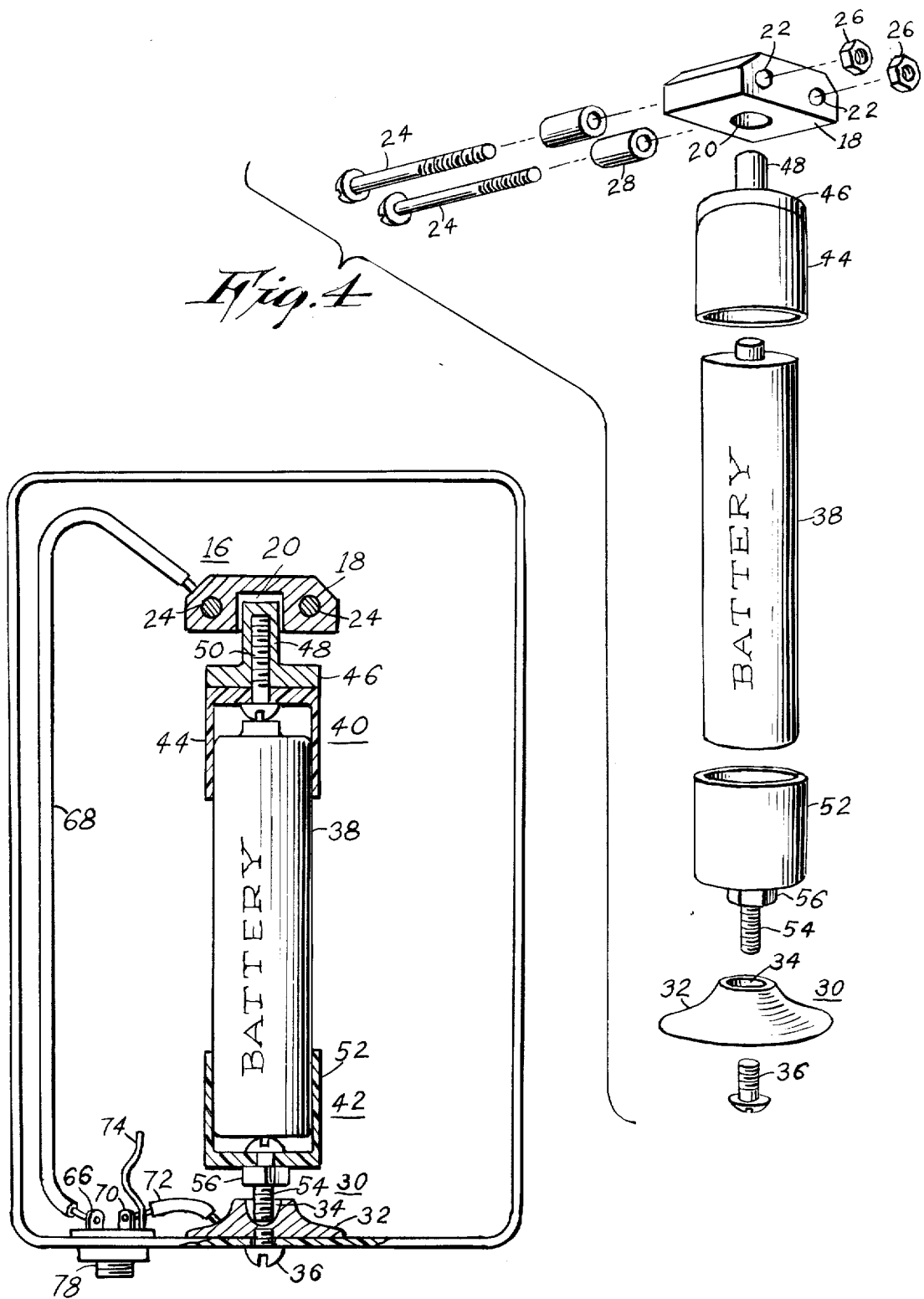

3,909,558

ELECTROMECHANICAL AMPLIFIER SOUND TRANSDUCER WITH COMBINED POWER SOURCE

BACKGROUND OF THE INVENTION

This invention relates to an electromechanical amplifier sound transducer, and more particularly to a device for converting acoustical power into electrical power by converting the sound wave into an amplified electrical wave.

Sound transducing systems are well known in the art. However, such systems are generally complex and require numerous components, including complicated electronic equipment and amplification systems. A greatly simplified sound transducer has been described in my co-pending Pat. application Ser. No. 454,224 entitled "Electromechanical Amplifier Sound Transducer", filed on Mar. 25, 1974. In that application there is described an electromechanical amplifying sound transducer including a diaphragm which receives acoustic waves or mechanical pulses and vibrates in response thereto. Conductive supports are mounted onto the diaphragm and are adapted to be interconnected to a source of electrical energy. A weighted conductive bar is loosely coupled to the supports. When the diaphragm vibrates in response to the acoustic waves or the mechanical pulses, the supports transmit the vibrations to the bar, whereby the bar can control the electrical energy delivered from the source of electrical energy so that the acoustic waves or the mechanical pulses are converted into amplified electrical waves.

While the aforementioned co-pending patent application greatly reduces the size and cost of a sound transducer, there is still somewhat of a size problem, since a separate energy source must be provided. Therefore, electrical wires must interconnect the sound transducer with an electrical source spaced from the transducer, in which case it is not a portable unit. On the other hand, if batteries are included with the afore-described device, a separate battery unit must be provided independent of the sound transducer. Furthermore, the weighted bar becomes an additional component which must be manufactured and fabricated to meet the requirements of the sound transducer.

It is accordingly an object of the present invention to provide an improved electromechanical amplifier sound transducer which avoids the aforementioned problems of other devices.

A further object of the present invention is to provide an electromechanical amplifier sound transducer, in which the power source, such as the battery, forms an integral part of the sound transducer itself.

Still a further object of the present invention is to provide an improved electromechanical amplifier sound transducer in which the component parts can be easily disassembled for simplified removal and replacement of the battery.

A further object of the present invention is to provide an improved electromechanical amplifier sound transducer of the type described in the aforementioned co-pending patent application, and wherein the battery is utilized as the conductive bar.

Yet another object of the present invention is to provide an improved electromechanical amplifier sound transducer in which the battery is utilized both as a source of energy as well as a structural component of the sound transducer.

Still a further object of the present invention is to provide an improved electromechanical amplifier transducer which is simple in construction, reliable in operation, and inexpensive in manufacture.

SUMMARY OF THE INVENTION

Briefly, the present invention provides an electromechanical amplifier sound transducer which includes a housing to which is mounted conductive supports. Coupling assemblies loosely interconnect the battery to the supports with a conductive connection therebetween. When the housing vibrates in response to acoustic waves, the supports transmit the vibrations to the battery to interrupt the conductive connection, whereby the acoustic waves can be converted into amplified electrical waves.

The aforemention objects, features and advantages of the invention, will, in part, be pointed out with particularity and, will, in part, become obvious from the following more detailed description of the invention, taken in conjunction with the accompanying drawings, which form an integral part thereof.

BRIEF DESCRIPTION OF THE DRAWINGS

In the drawings:

FIG. 1 is a perspective view of the electromechanical amplifier device of the present invention;

FIG. 2 is a side cross-sectional view taken along line 2—2 of FIG. 1.

FIG. 3 is an enlarged front view of the device shown, with the cover removed and illustrated partly in cross section;

FIG. 4 is an exploded view of part of the components of the device of the present invention;

FIG. 5 is a side view showing a method of assembly of the device, and

FIG. 6 is an electric circuit of a sound system utilizing the electromechanical amplifier sound transducer of the present invention.

DESCRIPTION OF THE PREFERRED EMBODIMENT

Referring now to the figures, there is shown an embodiment of the present invention including a housing 10 having a rear case portion 12 and a front cover portion 14 mounted onto the case. A first conductive support shown generally at 16 includes a block 18 having a longitudinal hole 20 therein and two transverse holes 22. The conductive support 16 is mounted onto the front 14 of the housing 10 by means of the bolts 24 retained in place by the nuts 26. Spacers 28 are situated on the front portion of the bolts to maintain the conductive support 16 in longitudinal alignment with the other support shown generally at 30.

The other conductive support 30 includes a frustroconical shaped section 32 having a cup shaped aperture therein 34 and is secured to the case by means of a screw 36.

A power source, shown as battery 38, is conductively connected to the conductive supports by coupling assemblies 40 and 42. Coupling assembly 40 includes a retaining cup 44 which snugly fits over one end of the battery 38. A conductive cap 46 having a stem 48 extending therefrom, is connected to the cup 44 by means of the screw 50. The stem 48 loosely fits within the hole 20 of the conductive support 16. The top of the cap 46 conductively connects to one terminal of the battery 38 by means of the screw 50.

The other coupling device 42 includes a retaining cup 52 which snugly fits over the other end of the battery 38. A bolt 54 is securely held onto the base of the cup by means of the nut 56. The bolt 54 extends within the cup shaped aperture 34 of the conductive support 30. The head of the bolt 54 conductively interconnects with the other terminal of the battery 38.

In operation, the device of the present invention is placed in a position to receive acoustic waves such as speech, music, etc. As the acoustic waves are receive the housing 10 begins to vibrate and the cover 14 also vibrates. The conductive support 16 physically mounted onto the cover 14 will vibrate in conjunction therewith. As the conductive support vibrates, the loosely fitted stem 48 within the hole 20 will vibrate and intermittently break the electrical connection between the conductive stem and the conductive support 16 thereby intermittently disconnecting the battery from the circuit. In this manner, the acoustic waves of the audible sound are converted into amplified electrical waves.

In order to audibly receive the acoustic waves which are detected by the transducer of the present invention, a speaker can be serially interconnected between the two conductive supports 16, 30. The electrical connection for such a speaker is shown in FIG. 6, wherein one conductive block 16 is electrically interconnected with one terminal 58 of a plug, and the other conductive support 30 is connected to the other terminal 60 of the same plug. A speaker, shown in phantom at 62 is plugged into the terminal plug by means of the phone jack connector 64. The speaker is then serially interconnected between the conductive supports. As the acoustic wave energy causes the battery to be intermittently disconnected from the circuit, energy will intermittently flow through the conductive supports which will be detected by the speaker, whereby the output from the speaker will be an amplified reproduction of the audible energy received by the device of the present invention.

The terminal plug, is shown physically connected to the unit in FIGS. 1 and 3. One terminal 66 of the plug is coupled by means of cable 68 to the conductive block 16. The other terminal 70 is coupled by means of the cable 72 to the conductive block 30. The spring post 74 is electrically interconnected with the terminal 70 so that when a phonojack 76 is inserted into the externally available plug 78, the stem 80 will contact the spring post 74 to be held thereby and make contact therewith, while the other terminal of the jack 76 is shown interconnected with a speaker 82 of the earphone type. However, it is understood that any other type of speaker could also be utilized to reproduce the sound detected by the device of the present invention, as well as any other type of plug connection.

Referring now to FIG. 5 it is noted that since the stem 54 of conductive support 42 is loosely coupled within the aperture cup 34, it is possible to tilt the stem within the cup, whereby as the cover 14 is removed from the case 12, the battery will be angularly assembled and can be easily replaced. When the cover 14 is removed from the case 12, the stem 54 pivots within the aperture 34 and the stem 48 slides within the hole 20. Since one of the conductive members is mounted onto the cover while the other conductive support is mounted onto the case, the battery can be easily replaced simply by removing the cover 14.

In one embodiment of the invention the conductive support 16 as well as the cap 46 have been made out of carbon material; the retaining cups 44 and 52 made out of plastic, and the lower end piece 32 made out of metal. The bolts were of a conductive material. The front cover 14 was made out of a clear plastic material. It is understood however, that other materials could easily be substituted as is well known in the art.

In actual use, it was found that the best reproduction of sound was achieved by holding the case in a position anywhere from a vertical upright to an angle of 45° with the upright. As was described in the aforementioned co-pending application, by varying the weight of the battery or coupling devices, as well as varying other factors, it is possible to modify the characteristics of the amplifying transducer.

By utilizing the device of the present invention there is achieved an extremely compact, simple, and inexpensive amplifier sound transducer which can be utilized in areas of restricted space requirements as well as in applications where easy portability and manipulation is required.

There has been disclosed heretofore the best embodiments of the invention presently contemplated. However, it is to be understood that various changes and modifications may be made thereto without departing from the spirit of the invention.

What is claimed is:

1. An electromechanical amplifier sound transducer comprising:
   a. housing means;
   b. conductive support means mounted on said housing means;
   c. electric energy source means; and
   d. mechanically loose coupling means for conductively connecting said energy source means to said support means and for enabling said support means to loosely support said energy source means, said housing means receiving acoustic waves and in response thereto transmitting vibrations through said conductive support means to said energy source means to cause interruptions of the conductive connection therebetween, whereby the acoustic waves can be converted into amplified electric waves.

2. The device as in claim 1 and wherein said electric source means is a battery.

3. The device as in claim 2 and further comprising externally available terminal means mounted onto said housing means connection thereto by a speaker, and wire means internal of said housing means and serially interconnecting said terminal means with said conductive support means.

4. The device as in claim 2 and wherein said support means include two conductive end pieces, and wherein said coupling means include two cupped shaped retaining pieces, said retaining pieces, said retaining pieces snugly fitting over the ends of said battery and loosely fitting into said conductive end pieces.

5. The device as in claim 4 and wherein said retaining pieces are of non-conductive material and said coupling means further include a conductive stem extending through the base of each retaining piece, one end of each stem contacting a terminal of the battery and the other end of each stem loosely fitting into respective ones of said end pieces.

6. The device as in claim 5 and wherein one of said end pieces includes a hole into which one of said stems loosely fits, and the other of said end pieces includes a cupped shaped aperture into which the other of said stems can rotatably pivot.

7. The device as in claim 6 and wherein the conductive stem which pivots in the aperture is a bolt extending through the retaining piece, and the other of the conductive stems includes conductive cap with an outwardly extending post, said conductive cap being retained onto the end of its retaining piece by a screw.

8. The device as in claim 7 and wherein said retaining pieces are of plastic, at least one of said stems is of carbon material, and at least one of said end pieces is of carbon material.

9. The device as in claim 4 and wherein said housing means comprises a case portion and a cover portion, one of said end pieces being mounted onto said case portion and the other of said end pieces being mounted onto said cover portion.

10. The device as in claim 9 and wherein said cover portion is of clear plastic material.

* * * * *